United States Patent Office 2,806,845
Patented Sept. 17, 1957

2,806,845

ADDITION PRODUCTS OF PROPENOIC ACID NITRILES AND ACIDIC, PHOSPHORUS- AND SULFUR-CONTAINING PRODUCTS

Joseph J. McBride, Jr., Cranford, N. J., assignor to Tidewater Oil Company, a corporation of Delaware No Drawing. Application March 15, 1954,
Serial No. 416,399

3 Claims. (Cl. 260—125)

The present invention relates to a novel group of chemical compounds having utility as oxidation-inhibitors for mineral oil compositions.

The novel compounds embodied herein are addition products of propenoic acid nitriles and acidic, phosphorus- and sulfur-containing products of reaction between a phosphorus sulfide and a hydrocarbon or mixtures of hydrocarbons, reactable with the sulfide to form acidic, phosphorus- and sulfur-containing products.

The nitrile component of the addition products embodied herein may be a nitrile of propenoic acid or alkyl-substituted propenoic acids which, for purposes herein, include nitriles of homologs of propenoic acid, illustrated by crotonic acid in which the alkyl substituent is on the beta-carbon atom, and nitriles of propenoic acid having an alkyl substituent on the alpha carbon atom of the acid, as illustrated by methacrylic acid, ethacrylic acid, and the like.

The acidic substances, containing phosphorus and sulfur, contemplated for reaction with the aforesaid nitriles may be selected from a variety of such substances prepared by reaction between phosphorus sulfides and hydrocarbons reactable therewith. Numerous substances of that type are known to the art and, hence, it is not considered necessary to describe such products in detail herein. For purposes of illustration, however, U. S. Patent No. 2,316,080 describes such products of reaction between phosphorus sulfides and olefin polymers; U. S. Patent No. 2,316,081 describes products of reaction between phosphorus sulfides and aromatics; and U. S. Patent No. 2,316,082 describes products of reaction between phosphorus sulfides and other types of hydrocarbons, including saturated hydrocarbons. Other suitable products of reaction between phosphorus sulfides and hydrocarbons, and useful for practice of this invention, are disclosed in copending application, Serial No. 309,152, filed September 11, 1952, now abandoned, entitled "Catalyzed Phosphorus Sulfide-Hydrocarbon Reaction Products and Method of Making Same." Although still other disclosures exist pertaining to phosphorus sulfide-hydrocarbon reaction products that are acidic and contain both phosphorus and sulfur, the aforesaid specifically-referred to patents serve to show the reactivity, under a variety of conditions, between phosphorus sulfides and various types of hydrocarbons to form reaction products that are oil-soluble per se and/or when neutralized with basic materials. The generic aspect of this invention contemplates use of such reaction products. Hence, and although the acidic reactant described hereinafter and utilized for illustrating embodiments of the invention was prepared by use of phosphorus pentasulfide and a hydrocarbon of certain type, such an acidic product has been used for purposes of illustration and not limitation.

With reference to the reaction between the stated nitriles and acidic reactant to form the compounds embodied herein, the amount of nitrile employed may be varied depending upon the extent to which it is desired to carry out reaction with the acidic substance. For obtaining substantially optimum conversion of the acidic substance to the nitrile reaction products thereof, it is preferred to employ an amount of nitrile sufficient to enable the reaction to proceed until substantially all of the acidic product has reacted and obtainment of such a result is facilitated by using an amount of nitrile theoretically sufficient to react with the acidic substance in mol to mol relationship; or an amount of nitrile in excess of that theoretically sufficient to react in mol to mol relationship may be used, with subsequent removal, if desired, of excess nitrile.

With further reference to the reaction that occurs between the stated nitriles and acidic, phosphorus- and sulfur-containing reactants, the reaction is of the exothermic type, proceeds rapidly, and in some cases, spontaneously. Hence, exceedingly high temperatures are not only not essential, but are actually undesired as in some instances, depending upon the particular nitrile employed, undesired polymerization of the nitrile reactant may be induced. Thus, the temperature conditions for the reaction are not limitative except that, depending on the particular nitrile used, the reaction temperatures should be below that sufficient to induce substantial polymerization of the nitrile. As an illustrative embodiment, and particularly with use of lower molecular weight propenoic acid nitriles such as acrylonitrile and crotononitrile, reaction temperatures of from about room temperature (e. g. 20° C.) to about 100° C. may be employed, with more specific illustrations being temperatures on the order of about 65 to about 90° C.

As to reaction time, it is preferred that the reactants be maintained under reaction conditions until the reaction mixture substantially ceases to decrease in neutralization number. Generally speaking, the time required to attain such a result is not critical to the extent that a set time can be given irrespective of the particular nitriles, acidic substances and other conditions employed. The most suitable conditions, inclusive of reaction time, to employ can be readily determined by simple experimentation by those skilled in the art but, for most purposes, a reaction time of up to about 3 to 4 hours usually produces suitable results although in many cases the extent to which reaction occurs may be complete after one-quarter of an hour.

In order to illustrate the invention, the following embodiments are set forth in which use is made, by way of example, of a furfural extract-$P_2S_5$ reaction product as the acidic, phosphorus- and sulfur-containing reactant. The furfural extract employed was obtained as an extract in selective solvent (furfural) refining of a Penn Neutral oil, said extract being characterized by having the following properties: Specific extinction coefficient of 58.8 at 2600 A.; viscosity (SUS) of 73.8 at 210° F.; gravity of 8.0 A. P. I.; and an average molecular weight of 316. In preparing the acidic reactant, a reaction mixture was prepared comprising 30 grams of phosphorus pentasulfide and 360 grams of the aforedefined extract as the hydrocarbon component. The mixture was heated for two hours at 150° C. with vigorous stirring, followed by diluting the reacted mixture with hexane, filtering to remove sludge and unreacted material, followed by removal of hexane from the filtrate. The resulting product was a dark-colored, viscous (of syrupy consistency) material having a neutralization number of 28.18, a sulfur content of 4.05% and a phosphorus content of 1.63%.

*Example I*

A mixture was prepared consisting of 30 grams of the aforedescribed acidic, phosphorus- and sulfur-containing product and 0.80 gram of acrylonitrile, i. e. an amount of acrylonitrile theoretically sufficient to react in substantially mol to mol relationship with the acidic reactant.

The mixture was heated at 85° C. for two hours with vigorous stirring, during which time no evidence of by-product formation was observed, to produce a product of addition reaction between the stated reactants, said addition product being a viscous, homogeneous, dark-colored liquid soluble in mineral oil and having a neutralization number of 18.56, a sulfur content of 3.98%, and a phosphorus content of 1.47%.

*Example II*

A reaction mixture was prepared using the same reactants and amounts thereof as in Example I but differing therefrom in that the reaction mixture was heated for four hours at 85° C. The reaction product had a neutralization number of 18.42, a sulfur content of 4.05%, a phosphorus content of 1.59%, and otherwise was similar to the addition product obtained in Example I.

*Example III*

A reaction mixture was prepared comprising 30 grams of the aforedescribed acidic reactant and 0.96 gram of crotononitrile. The mixture was heated at 85° C. for 2 hours with vigorous stirring, during which time no evidence of by-product formation was observed, to produce a product of addition reaction between the stated reactants, said addition product being a viscous homogeneous, dark-colored liquid soluble in mineral oil and having a neutralization number of 20.66, a sulfur content of 3.98%, and a phosphorus content of 1.48%.

*Example IV*

A reaction mixture was prepared using the same reactants, and amounts thereof as in Example III but differing therefrom in that the reaction mixture was heated for four hours at 85° C. The reaction product had a neutralization number of 18.83, a sulfur content of 4.00%, a phosphorus content of 1.54%, and otherwise was similar to the addition product of Example III.

The novel addition products embodied herein are useful as additives for mineral oil compositions to impart anti-oxidant properties thereto. Such a utility for the novel products is more fully described in my copending application, Serial No. 331,496, filed January 15, 1953, relating to mineral oil compositions containing compounds such as embodied herein.

Although the present invention has been described in conjunction with certain preferred embodiments thereof, those skilled in the art will readily recognize that variations and modifications can be made. Such modifications and variations are to be considered to be within the purview of the specification and scope of the appended claims.

I claim:

1. An addition product of a nitrile from the group consisting of acrylonitrile and crotononitrile and an acidic, phosphorus- and sulfur-containing product of reaction between phosphorus pentasulfide and a furfural extract from a petroleum lubricating oil fraction.

2. The product of claim 1 in which the nitrile is acrylonitrile.

3. The product of claim 1 in which the nitrile is crotononitrile.

References Cited in the file of this patent

UNITED STATES PATENTS

| | | |
|---|---|---|
| 2,593,496 | Smith et al. | Apr. 22, 1952 |
| 2,658,062 | Jones | Nov. 3, 1953 |
| 2,673,196 | Hughes et al. | Mar. 23, 1954 |

OTHER REFERENCES

Houben Weyl: Methods of Organic Chemistry, vol. IV, Acid Compounds III—pages 672–3.